(12) United States Patent
Taylor et al.

(10) Patent No.: US 6,699,148 B1
(45) Date of Patent: Mar. 2, 2004

(54) BELT DRIVE WITH SELF ADJUSTING CONTACT MECHANISM

(75) Inventors: Matthew G. Taylor, Longwood, FL (US); Richard V. Rigling, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/694,179

(22) Filed: Oct. 23, 2000

(51) Int. Cl.$^7$ .............................. F16H 7/08; F16H 7/22
(52) U.S. Cl. ...................... 474/111; 474/109; 474/140
(58) Field of Search .................... 474/111, 140, 474/135, 133, 109, 112, 113–117

(56) References Cited

U.S. PATENT DOCUMENTS

| | | | | |
|---|---|---|---|---|
| 3,136,169 A | * | 6/1964 | Karger et al. ............... | 474/111 |
| 3,148,555 A | * | 9/1964 | Peras ......................... | 474/111 |
| 3,198,025 A | * | 8/1965 | Peras ......................... | 474/111 |
| 3,838,606 A | * | 10/1974 | Scalise ....................... | 474/111 |
| 4,351,636 A | * | 9/1982 | Hager ......................... | 474/135 |
| 4,564,098 A | * | 1/1986 | Hormann ................. | 474/134 X |

FOREIGN PATENT DOCUMENTS

| | | | |
|---|---|---|---|
| DE | 361561 A1 | * | 11/1987 |
| IT | 411426 | * | 8/1954 |
| JP | 58-57551 | * | 4/1983 |
| JP | 58-200841 | * | 11/1983 |
| JP | 62-165055 | * | 7/1987 |
| JP | 8-81921 | * | 3/1994 |

* cited by examiner

*Primary Examiner*—Thomas R. Hannon
*Assistant Examiner*—Marcus Charles
(74) *Attorney, Agent, or Firm*—Wolf, Greenfield & Sacks, P.C.

(57) ABSTRACT

A self-adjusting contact mechanism is provided for a belt drive system which mechanism includes a contact shoe having a low friction surface in contact with the belt and a mechanism for biasing the low friction surface of the contact shoe against the belt with a controlled force profile which may be constant or may vary within a selected range over the permitted movement for the shoe. The shoe is preferably mounted to a lever arm through a pivot joint to permit the shoe to remain substantially parallel to the belt and in contact with the belt over the entire low friction surface of the shoe regardless of lever arm position. Force on the lever arm is provided by a compression mechanism which may include a pair of counterbalancing springs, with the spring biasing the lever arm toward the belt being stronger than the counterbalancing spring and preferably with the force for at least one of the springs being adjustable. The controlled force profile may be a substantially constant force regardless of contact shoe position.

14 Claims, 3 Drawing Sheets

BELT DRIVE WITH SELF ADJUSTING CONTACT MECHANISM

FIELD OF THE INVENTION

The present invention relates to belt drive systems and more particularly to self-adjusting contact mechanisms for such systems.

BACKGROUND OF THE INVENTION

Machines have long incorporated belts as transportation mechanisms to move objects. A belt drive system may use surface contact between a belt and a contact surface on each object to transport the object, the drive belt of such a system maintaining frictional contact with the object and/or cogs or other projections may be provided on the contacting surface of the belt which engage mating depressions in the object. In order for contact with each object to be maintained with sufficient pressure to assure frictional engagement and/or to assure mating of a belt projection with an object depression, and thus to avoid slippage, periodic adjustments are often required to accommodate variations in the belt and/or other system components due to factors including, but not limited to, tolerance variations and wear over time.

A contact shoe may sometimes be used to maintain and enhance positioning of the drive belt and engagement between the drive belt and the object being moved, proper adjustment of the contact shoe being required to prolong belt life, minimize positioning "slop," and account for variations in objects being moved. Some such contact shoes are bolted or otherwise secured at a fixed angle/position, thereby providing a force or pressure to maintain contact between the drive belt and the contact surface of the object that may vary with wear and other factors. While these prior contact shoes generally could manually be adjusted with a slotted mounting bracket to set the contact shoe at a fixed position relative to the belt, such shoes are difficult to adjust and position precisely and cannot automatically adapt to changing conditions in the belt system.

Other prior contact shoes have utilized a single helical spring to provide limited control of contact pressure/position between the shoe and belt, for example using the spring provide an adjustable contact force or self-centering contact shoe with variable position to automatically adjust for belt system wear and position over a range of tolerances. Any larger adjustment must be made to the whole shoe. As a result, these devices require frequent, expensive maintenance down time, cannot function over a wide range of tolerances, and unless monitored and manually adjusted at relatively frequent intervals, cannot provide an even force over the shoe against the belt, resulting in slippage and other problems which can impede precise and rapid operation of the belt system.

A need therefore exists for improved drive belt contact mechanism which overcome the various prior art deficiencies indicated above.

SUMMARY OF THE INVENTION

In accordance with the above, this invention provides a self-adjusting contact mechanism for a belt system which includes a shoe base having a low friction belt contacting surface, an arm assembly pivotally connected to a stable surface at a first point thereon and having a shoe base attached at a second point thereon spaced from the first point, and a compression mechanism acting on said arm assembly at a contact point spaced from the second point to apply a controlled force to the arm assembly, and through the arm assembly to the shoe base attached thereto, to maintain the low friction surface of the shoe base in controlled force contact with the belt. The compression mechanism may include at least one spring pretensioned to act on the arm assembly at the contact point to bias the arm assembly in a direction to maintain the low friction surface of the attached shoe base in contact with the belt. For at least one embodiment, the contact point is at the first or pivot point and the spring is part of the pivot at such point. Such embodiment may include a tension adjusting mechanism for the spring.

For other embodiments, the arm assembly includes an L-shaped arm, the first point being at an elbow of the arm, the second point being at one end of the arm and the contact point being at the other end of the arm. For this embodiment, the spring may be a compression spring tensioned to apply a force to the arm at the contact point to pivot the arm in a direction to bring the low friction surface of the shoe base attached to the corresponding arm assembly into contact with the belt. The compression mechanism may also include a second compression spring mounted to apply a counterbalancing force to the arm at the contact point to the force being applied by the spring, the force applied by the spring being greater than the force applied by the second spring. The spring and second spring may be selected and pretensioned so that a substantially constant force is applied through the arm and the shoe base attached thereto to the belt regardless of arm position. A pretensioning adjustment may also be provided for at least one of the springs and, more generally, a pretensioning adjustment mechanism may be applied for the compression mechanism. The relative lengths of legs for the L-shaped arm may be selected to achieve a selected mechanical advantage.

The arm assembly may include at least two brackets attached at spaced points along the arm, the first or pivot point being at substantially one end of the each bracket, which end is pivotably connected to the stable surface, and the second point being at substantially a second end of each bracket. The brackets are on opposite sides of the L-shaped arm for at least some embodiments. The second end of each bracket is preferably pivotably connected to the shoe base, permitting the shoe base to pivot to maintain the low friction surface substantially parallel to the belt, the shoe base being pivotably connected to the arm assembly at the second point for all preferred embodiments.

There may be a plurality of shoe bases, each acting at a different point along the belt, there being at least one arm assembly for each shoe base. There may also be a plurality of compression mechanisms acting on each arm assembly and the low friction surface may be removably attached to each shoe base.

In accordance with another aspect of the invention, the self-adjusting contact mechanism for the belt system includes a shoe base having a low friction belt contacting surface, a mount which supports the shoe base with its low friction surface at least adjacent the belt, and a compression mechanism having first and second compression components mounted to provide counterbalancing forces to the mount, and thus to the shoe base, the relative counterbalancing forces of the components resulting in the selected, controlled force profile for the shoe surface against the belt as a function of shoe base position. The force profile may, for example, be a substantially constant force. The compression components may each be a selectively pretensioned compression spring and a mechanism may be provided for controlling the pretensioning of at least one of the springs. The shoe base may also be pivotably connected to the mount to permit the shoe base to pivot to maintain the low friction surface substantially parallel to the belt.

Various embodiments of the present invention provide certain advantages and overcome certain drawbacks of prior devices and systems. Embodiments of the invention may not share the same advantages and those that do may not share them under all circumstances. This being said, the present invention provides numerous advantages including the noted advantage of prolonging belt life and minimizing positioning "slop," variations in different objects, and maintenance down time.

Further features and advantages of the present invention as well as the structure of various embodiments of the present invention are described in detail below with reference to the accompanying drawings.

BRIEF DESCRIPTION OF THE DRAWINGS

Various embodiments of the invention will now be described, by way of example, with reference to the accompanying drawings, in which.

DETAILED DESCRIPTION

Figure 1:
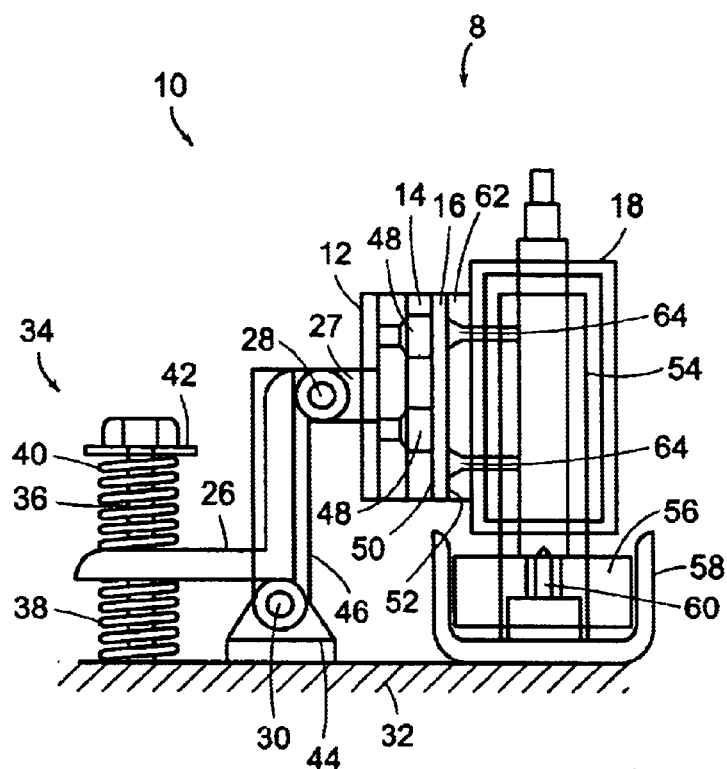
FIG. 1 is a side view of an illustrative embodiment of the invention.

FIG. 1 illustrates one embodiment of a contact shoe device 10 for providing a continuous contact force between a drive belt 16 and an object 18 of a belt drive system 8, the drive being adjustable so that contact shoe device 10 maintains the desired contact with at least a selected minimum force regardless of variations in objects 18 and belt 16. Contact shoe device 10 includes a shoe base 12 having a low friction layer 14 for contact with drive belt 16.

Many materials may be utilized for low friction layer 14 to allow a first side 50 of drive belt 16 to slide substantially freely over the surface of the low friction layer. The low friction layer may, for example, be a polished metal surface, smooth plastic surface, rotating rollers or balls, a surface of a suitable low friction material, such as TEFLON™ (polytetraflouroethylene), or other low-friction surface known in the art. Low friction layer 14 may be of the same material as shoe base 12, may be integrally formed with shoe base 12, or may be a layer of different material either fixably or removably attached to shoe base 12 with at least one screw or other suitable attachment device 48, or may be coated on the surface of shoe base 12. The low friction layer may be replaced on shoe base 12 to facilitate different types of drive belt systems, or different applications, or may be renewed or replaced in response to wear over time. Shoe base 12 is mounted to at least one mounting bracket 46, and preferably to at least two mounting brackets 46a, 46b (FIG. 3), one at each end of shoe base 12. Each mounting bracket 46a, 46b is pivotally attached to a corresponding mounting bracket 44a, 44b at pivots 30a, 30b. Mounting bracket 44 is mounted to a stable surface 32.

In the illustrative embodiment shown in FIG. 1, shoe base 12 has at least one rearwardly extending lug 27, which is pivotally connected to mounting bracket 46 at pivot 28. Lug 27 may, alternatively, be a pair of lugs, each lug pivotally connected to each mounting bracket 46a, 46b. The pivotal connection 28 allows the shoe base 12 to rotate in the plane of drive belt 16 and helps maintain shoe base 12 in a parallel and aligned position with drive belt 16 regardless of variations in position of mounting bracket 46 on pivot 30 and/or the variable placement of belt 16 due to factors described above. Pivots 28, 30 are known in the art and include, but are not limited to, bearings, bushings, fulcrums, and pins. Alternatively, shoe base 12 and or lugs 27 may be rigidly connected to mounting bracket 46, and may be integrally formed with mounting bracket 46.

Figure 3:
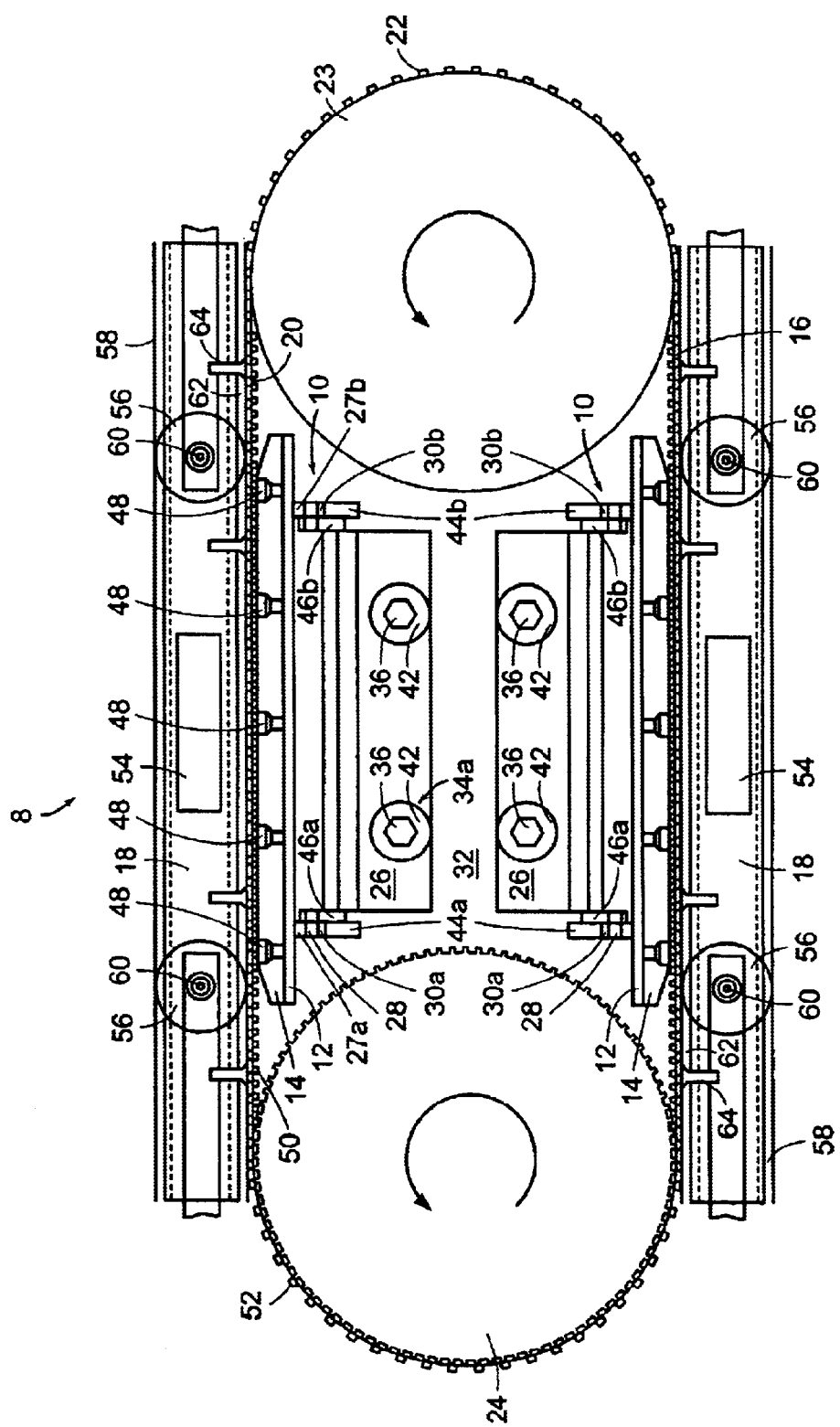
FIG. 3 is a top view of a conveyor system incorporating the embodiment of FIG. 1.

Mounting bracket(s) 46 is removably or fixably attached to arm 26, and may be integrally formed with arm 26. As shown in FIG. 3, arm 26 is rigidly connected to at least two mounting brackets 46a, 46b, one at each end of arm 26. The arm 26 is substantially L-shaped, pivots 30a, 30b being located at the elbow of the L-shaped arm, and are preferably mounted at each side of arm 26, as shown in FIG. 3. Thus, arm 26 preferably extends between mounting brackets 44a, 44b, mounting brackets 46a, 46b, and pivots 30a, 30b.

Compression mechanism 34 applies a force through arm 26 and shoe base 12 to drive belt 16 to insure proper engagement between object 18 and the drive belt. This results in a force profile as a function of arm angle/shoe base position which may for some embodiments be a substantially constant contact force between shoe base 12 and drive belt 16, which does not vary dependent on the position of the shoe base, but need not be constant so long is the force is always within a selected range sufficient to maintain good contact between the belt and object, but not so much as to move or apply a sheer force to the object.

For the embodiment of FIG. 1, compression mechanism 34 includes a mounting post 36 attached to the same surface 32 to which mounting brackets 44a, 44b are mounted (as shown) or to another suitable stable surface. Arm 26 is moveably or slidably mounted to the mounting post 36, for example, by one or more posts 36 passing through corresponding openings in the arm (FIGS. 1 and 3). Components suitable for mounting post 36 are known in the art and are preferably circular with a threaded or smooth surface, for example a bolt.

Compression mechanism 34 provides a force through arm 26 to contact shoe 12. In the preferred embodiment of FIG. 1, the force is provided by at least two springs 38, 40 slideably mounted to mounting post 36 and engaging opposite sides of arm 26. Spring 38 is mounted between arm 26 and surface 32 while spring 40 is mounted between arm 26 and surface 42 rigidly attached to mounting post 36.

Surface 42 may be fixably attached to mounting post 36 or may be integrally formed as part of the mounting post. For example, where mounting post 36 is a bolt, surface 42 may be provided by the bolt head as shown in FIG. 1. Alternatively, surface 42 may be moveably attached to mounting post 36, such that placement of surface 42 on mounting post 36 is variable along the length of the mounting post. For example, surface 42 may be rotatably mounted to mounting post 36, placement of surface 42 being variable along the length of the mounting post by rotating surface 42 on a threaded surface of the mounting post; or surface 42 may be slidably attached to mounting post 36 and locked at a desired position on post 36 by a suitable detent device.

In operation for the embodiment of FIGS. 1 and 3, as force is applied to the contact shoe 12 from the drive belt 16, a force is applied to arm 26 to pivot the arm counterclockwise around pivot 30, this force being counteracted by the force of compression of spring 38 on the arm. Similarly, if there is slack in drive belt 16 or the force/pressure applied to shoe base 12 is otherwise decreased, compression spring 38 causes arm 26 to rotate clockwise around pivot 30 against the counteracting force of compression spring 40 to compensate for such change, the force of compression spring 38 preferably being stronger than that of spring 40. Thus, as spring 38 maintains contact between shoe base 12 and drive belt 16, and between belt 16 and object 18, spring 40 provides an off-set force to spring 38, such that compression mechanism 34 provides a substantially controlled force to shoe base 12, which for some embodiments may be a substantially constant force. Spring 40 also provides an automatic centering force to shoe base 12 to prevent the shoe base from exceeding operational contact limitations. This results in compression mechanism 34 providing a controlled force to shoe base 12, and thus, to drive belt 16, independent of the position of object 18 and compression of belt 16, and thus of shoe base 12. As arm 26 rotates around pivot 30, shoe base 12 correspondingly, rotates around pivot 28 to maintain substantially uniform, parallel contact with drive belt 16 over substantially its entire low friction surface 14. The relative lengths of the two legs of arm 26 may be selected to achieve a desired mechanical advantage for the self-adjusting contact mechanism.

While for the illustrative embodiment compression springs 38, 40 are used to provide a force to arm 26, other suitable components might also be utilized, including, but not limited to, helical springs, compression leaves, compressive struts, air bladders, and various compressive, elastic, and resilient materials. Springs 38, 40 may have the same or differing uncompressed lengths and/or spring constants. Preferably, spring 38 provides a greater net force on arm 26 than spring 40 to ensure constant contact between shoe base 12 and drive belt 16, the net force applied to shoe base 12 for an illustrative embodiment being approximately 100 pounds.

To adjust the responsiveness of compression mechanism 34, spring 40 is preloaded by adjusting the distance between surface 42 and arm 26 as arm 26 is held in position by contact between shoe base 12 and drive belt 16. Thus, the compression of spring 38 is not substantially affected by adjustment of spring 40 length. Mounting post 36 may, for example, be a threaded bolt rotated into surface 32 to increase the compression force of spring 40 and rotated out of surface 32 to decrease the compression force of spring 40. Alternatively, as described above, the placement of surface 42 on mounting post 36 may be variable along the length of the mounting post. In such an embodiment, surface 42 may be secured at a selected position along the length of mounting post 36 to either increase or decrease the distance between surface 42 and arm 26. As spring 40 is preloaded by decreasing the distance between surface 42 and arm 26, spring 40 will apply a greater force against arm 26 and will counteract the force of spring 38 applied against arm 26. Thus, the increasing force of spring 40 counteracts or offsets the force of spring 38, thus, decreasing the effective or net force of compression mechanism 34, or decreasing the bias of shoe base 12 toward drive belt 16. The reverse occurs when the distance between surface 42 and arm 26 is increased.

Alternatively or additionally, a nut or other suitable mechanism may be placed on post 36 between surface 32 and spring 38 and its position on mounting post 36 adjusted along the length of the mounting post to independently preload spring 38. As the preload on spring 38 is increased, its effective force on arm 26, and thus on shoe base 12 is effectively increased, or more biased towards drive belt 16; reducing the preload has the opposite effect.

Many methods and devices are suitable for adjusting the force of springs 38, 40 in compression mechanism 34 in addition to those discussed above, including, but not limited to, placing additional spacers on mounting post 36 and replacing springs 38, 40 with springs of different spring constants and/or uncompressed lengths. Further, while the counterbalancing force of spring 40 is preferable and is desirable so as to facilitate the application of a more controlled force to shoe base 12, and its is frequently more convenient to adjust force with spring 40 rather then spring 38, spring 40 is not essential to the practicing of the invention, and for some embodiments, only spring 38 may be used in compression mechanism 34.

Figure 2:
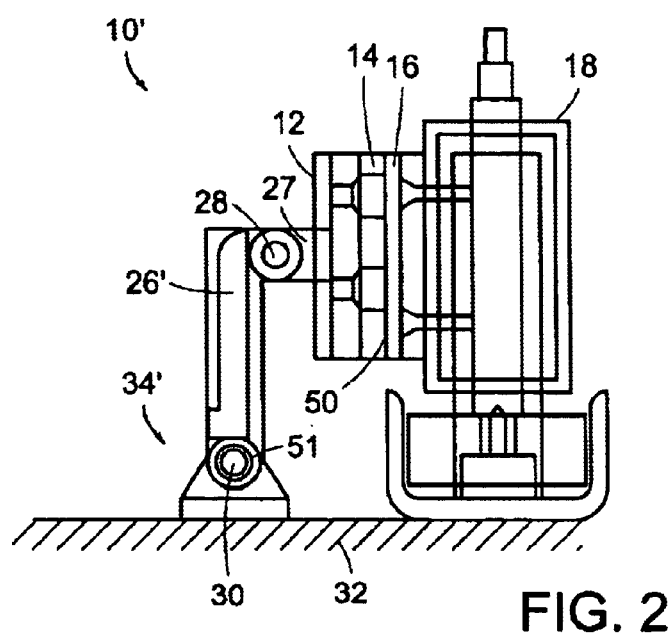
FIG. 2 is a side view of an alternative embodiment of the invention.

FIG. 2 illustrates an alternative embodiment with a compression mechanism 34' which may be incorporated into pivot 30, pivot 30 for example including at least one coil spring 51 which may be precompressioned to provide a selected clockwise force to arm 26. This force may be adjusted by utilizing mechanisms known in the art to fix one end of coil spring 51, while moving the other end to increase or decrease tension on the spring. Other devices appropriate for resisting and creating rotational torque on arm 26 include, but are not limited to, leaf springs, and other types of spring or torsion devices, including various elastomeric resilient materials. Other mechanisms for applying a controlled force to shoe base 12 might in some cases also be used.

The force applied to shoe base 12 and by the shoe base to belt 16 is thus a controlled variable or constant force to achieve a desired profile depending on the type of belt system or application. For example, the compression mechanism may apply a sufficient force through arm 26 to maintain continuous contact between shoe base 12 and drive belt 16 and to maintain placement and compression of the drive belt and to also maintain substantially continuous contact between drive belt 16 and object 18 notwithstanding system vibration, positioning "slop", variations in size and/or position of objects 18, and wear or other belt variations over time and/or other factors affecting drive belt position and contact with object 18, while not exerting excessive force on the object. Arm 26, particularly if L-shaped as shown in FIG. 1, can, depending on the relative length of its arms, also provide a mechanical advantage so that greater force can be exerted on belt 16 then is present at compression mechanism 34.

As shown in FIG. 3, arm 26 may be an L-shaped plate, extending along the length of drive belt 16 and between mounting brackets 44a, 44b, mounting brackets 46a, 46b, and pivots 30a, 30b. One or more compression mechanisms 34 may be attached to such a plate, to more evenly transfer force along the complete length of shoe base 12 and to drive belt 16. Alternatively, multiple arms 26, each with at least one individual compression mechanism 34, may be attached to a single shoe base 12 to transfer force more evenly to the shoe base. As shown in FIG. 3, multiple shoe bases 12 may be mounted to the drive belt system; at least one shoe base 12 is mounted to contact the drive belt 16 as the drive belt moves from idler wheel 23 to drive wheel 24, and at least one shoe base 12 is mounted to contact drive belt 16 as the drive belt moves from drive wheel 24 towards idler wheel 23.

To help maintain the horizontal and vertical position of object 18 and to help maintain engagement with drive belt 16, objects 18 frequently include at least one support wheel 54 as shown in FIGS. 1, 2, and 3 and/or may include at least one guide wheel 56. Support wheel 54 and/or guide wheel 56 may freely slide in a groove formed by a guide rail 58 and are guided by lateral sides of guide rail 58 as object 18 is driven by drive belt 16. As an object 18 moves with drive belt 16, support wheel 54 and/or guide wheels 56 move with object 18 within the constraints of guide rail 58, and thus, the guide rail resists pressures on object 18 to move in any lateral or rotational dimension other than the desired direction in which the object is being driven by drive belt 16, and helps maintain engagement contact between drive belt 16 and object 18. Each guide wheel 56 may be attached directly to object 18, or be attached through a shaft 60 (as shown) or other suitable component.

Figure 4:
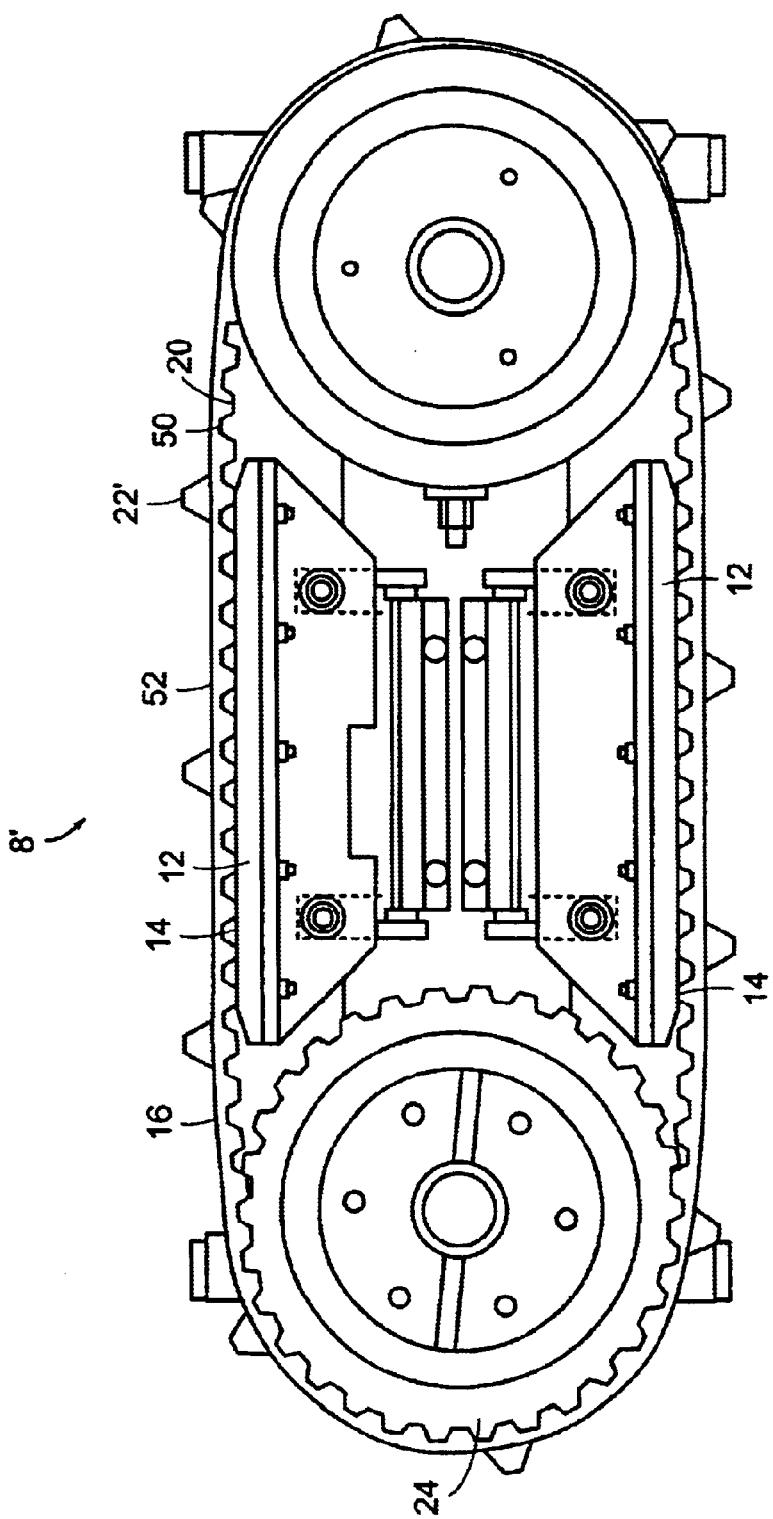
FIG. 4 is a top view of an alternative conveyor system incorporating the embodiment of FIG. 1.

Drive belt 16 may have a plurality of cogs 20, shown in FIGS. 3 and 4, on a first side 50 which contact both the low friction layer or surface 14 of shoe base 12 and corresponding cogs or teeth on drive wheel 24. Idler wheel 23 may also have corresponding cogs/teeth to mate with cogs 20 or may have a smooth surface contacting cogs 20 as shown in the Figs. Cogs 20 slide substantially freely over low friction surface/layer 14 and contact drive wheel 24 which provides the driving force for the drive belt.

A second side 52 of drive belt 16 may also contain a plurality of cogs 22, 22' for contacting objects 18 to facilitate driving of the objects by the system. Alternatively, cogs 22 may not only drive objects 18, but may also contact a suitable drive wheel to provide the driving force for the belt. Cogs 22 have a smaller size and/or greater frequency on second side 52 of drive belt 16 than cogs 22' of system 8' shown in FIG. 4. Cogs 22 may, for example, be shaped and formed to have the same size and frequency as cogs 20 on first side 50 of the drive belt, the increased frequency and decreased size of cogs 22 increasing the number of cogs in engagement with each object 18, and correspondingly, decreasing the individual engagement force per cog between object 18 and drive belt 16 and providing other potential advantages. The frequency of cogs 22 may, for example, be five times greater than for cogs 20' and the height of cogs 22 may be half that for cogs 20'. This reduces torque forces on object 18 for system 8 over system 8' and may increase the lifetime of drive belt 16. However, depending on the application and other factors, either belt system may be utilized when practicing the invention.

For system 8, standard precision manufactured plates 62 may be attached to object 18, recesses between teeth 63 on each plate mating with cogs 22. This creates more precise mating between cogs 22 and each object 18 to decrease drive belt wear and increase the reliability of the engagement between the drive belt and the object.

For an illustrative embodiment, drive belt 16 is 3 inches wide, and cogs 20, 22 are each 3 inches wide, and have a height of approximately ½ inch, a thickness of approximately ½ inch, and a space between cogs of approximately ½ inch, the cog frequency thus being approximately 2 teeth per inch. Thus, each cog 20, 22 has an approximate square cross-section.

While the invention has been shown and described above with reference to various illustrative embodiments, and variations on these embodiments have been discussed throughout the above description, other variations are also possible. For example, while for the embodiments shown in the figures, and in particular FIGS. 3 and 4, a single shoe 12 is shown on each side of belt 16, which shoe is supported by a single arm assembly formed by arm 26 and brackets 46, this is not a limitation on the invention, and it is also possible for there to be a single shoe on only one side of the belt, two or more shoes on only one side of the belt or some combination of one or more shoes on both sides of the belt. Each shoe may be supported by a single arm assembly as shown or each shoe may be supported by two or more arm assemblies. The arm assemblies also may be as shown with both L-shaped arms 26 and brackets 46 or may be modified so as to have only an L-shaped arm 26 which is modified to connect to both pivots 28 and 30, or may have only L-shaped brackets which are the same as the brackets 46 shown but also have a leg extending into compression mechanism 34. Compression mechanism 34 may also be turned so as to be perpendicular to shoe 12 and to apply a controlled force profile, including a substantially constant force profile, obtainable with the coil springs 38 and 40 on an in-line or perpendicular mount rather than a parallel mount as shown in FIG. 1. Other variations on the invention are also possible while remaining within the spirit and scope of the invention. Thus, it is to be understood that the embodiments shown are for purposes of illustration only and that the foregoing other changes in form and detail may be made therein by one skilled in the art while still remaining within the spirit and scope of the invention, which is to be defined only by the appended claims.

What is claimed is:

1. A self adjusting contact mechanism for a belt system including:
   (a) a shoe base having a low friction belt contacting surface;
   (b) an arm assembly pivotally connected to a stable surface at a first point thereon and having a shoe base attached at a second point thereon spaced from said first point; and
   (c) a compression mechanism acting on said arm assembly at a contact point spaced from said second point to apply a controlled force to the arm assembly, and through the arm assembly to the shoe base attached thereto, to maintain the low friction surface of the shoe base in controlled force contact with the belt, the compression mechanism including at least one spring pretensioned to act on said arm assembly at said contact point to bias said arm assembly in a direction to maintain the low friction surface of the attached shoe base in contact with the belt, the arm assembly including an L-shaped arm, said first point being at an elbow of said arm, said second point being at one end of said arm and said contact point being at the other end of said arm, and wherein said spring is a compression spring tensioned to apply a force to said arm at said contact point to pivot said arm in a direction to bring the low friction surface of the shoe base attached to the corresponding arm assembly into contact with the belt, the compression mechanism further including a second compression spring mounted to apply a counterbalancing force to said arm at said contact point to the force being applied by said spring, the force applied by said spring being greater than the force applied by said second spring.

2. A mechanism as claimed in claim 1, wherein said contact point is at said first point and said spring is part of a pivot at said first point.

3. A mechanism as claimed in claim 2 including a tension adjusting mechanism for said spring.

4. A mechanism as claimed in claim 1, wherein said spring and said second spring are selected and pretensioned so that a substantially constant force is applied through said arm and the shoe base attached thereto to the belt regardless of arm position.

5. A mechanism as claimed in claim 1 including a pretensioning adjustment for at least one of said springs.

6. A mechanism as claimed in claim 1 wherein said arm has legs, the relative lengths of which are selected to achieve a selected mechanical advantage.

7. A mechanism as claimed in claim 1 including a pretensioning adjustment mechanism for said compression mechanism.

8. A mechanism as claimed in claim 1, wherein said shoe base is pivotably connected to said arm assembly at said second point, permitting the shoe base to pivot to maintain said low friction surface substantially parallel to the belt.

9. A mechanism as claimed in claim 1 wherein there are a plurality of said shoe bases, each acting at a different point along said belt, there being at least one arm assembly for each said shoe base.

10. A mechanism as claimed in claim 1 wherein there are a plurality of compression mechanisms acting on each arm assembly.

11. A mechanism as claimed in claim 1 wherein said low friction surface is removably attached to said shoe base.

12. A self adjusting contact mechanism for a belt system including:
   (a) a shoe base having a low friction belt contacting surface;
   (b) an arm assembly pivotally connected to a stable surface at a first point thereon and having a shoe base attached at a second point thereon spaced from said first point; and
   (c) a compression mechanism acting on said arm assembly at a contact point spaced from said second point to apply a controlled force to the arm assembly, and through the arm assembly to the shoe base attached thereto, to maintain the low friction surface of the shoe base in controlled force contact with the belt, the compression mechanism including at least one spring pretensioned to act on said arm assembly at said contact point to bias said arm assembly in a direction to maintain the low friction surface of the attached shoe base in contact with the belt, the arm assembly including an L-shaped arm, said first point being at an elbow of said arm, said second point being at one end of said arm and said contact point being at the other end of said arm, and wherein said spring is a compression spring tensioned to apply a force to said arm at said contact point to pivot said arm in a direction to bring the low friction surface of the shoe base attached to the corresponding arm assembly into contact with the belt, the arm assembly including at least two brackets attached at spaced points along said arm, said first point being at substantially one end of each bracket, which end is pivotably connected to said stable surface, and said second point being at substantially a second end of each bracket.

13. A mechanism as claimed in claim 12 wherein said brackets are on opposite sides of said arm.

14. A mechanism as claimed in claim 13 wherein said second end of each bracket is pivotably connected to said shoe base, permitting the shoe base to pivot to maintain said low friction surface substantially parallel to the belt.

* * * * *